(12) United States Patent
Schuler et al.

(10) Patent No.: US 8,443,955 B2
(45) Date of Patent: May 21, 2013

(54) CLUTCH SYSTEM AND METHOD FOR CONTROLLING A CLUTCH SYSTEM

(75) Inventors: Ralf Schuler, Esslingen (DE); Werner Weber, Vaihingen (DE); Kaspar Schmoll Genannt Eisenwerth, Sachsenheim (DE); Alexander Bawidamann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 12/523,558

(22) PCT Filed: Oct. 16, 2007

(86) PCT No.: PCT/EP2007/060997
§ 371 (c)(1),
(2), (4) Date: Dec. 16, 2009

(87) PCT Pub. No.: WO2008/086906
PCT Pub. Date: Jul. 24, 2008

(65) Prior Publication Data
US 2010/0101913 A1    Apr. 29, 2010

(30) Foreign Application Priority Data
Jan. 19, 2007   (DE) .......................... 10 2007 003 902

(51) Int. Cl.
*F16D 48/06*   (2006.01)
*F16D 25/08*   (2006.01)

(52) U.S. Cl.
USPC .................. 192/85.53; 192/85.55; 192/85.63; 192/30 W

(58) Field of Classification Search ............... 192/85.53, 192/85.55, 85.59, 85.6, 30 W
See application file for complete search history.

(56) References Cited

U.S. PATENT DOCUMENTS

| 5,002,170 A | 3/1991 | Parsons et al. |
| 7,419,456 B2 * | 9/2008 | Knoblauch et al. ........... 477/174 |
| 2006/0016662 A1 * | 1/2006 | Baehr et al. .............. 192/85 CA |
| 2006/0157315 A1 | 7/2006 | Kraxner |

FOREIGN PATENT DOCUMENTS

| EP | 1681487 A1 | 7/2006 |
| WO | 8903318 A1 | 4/1989 |

* cited by examiner

*Primary Examiner* — Richard M. Lorence
(74) *Attorney, Agent, or Firm* — Maginot, Moore & Beck

(57) ABSTRACT

The invention relates to a device and to a method for controlling a coupling system having a coupling provided with a hydraulic actuation system, which includes an adjustable coupling part for connecting and separating a power transmission path between a coupling input side and a coupling output side, a hydraulic connection that connects the actuation unit to an electrohydraulic actuator that is arranged outside the coupling, and a control unit for controlling the actuator. The hydraulic connection forms a hydraulic system together with hydraulic components of the actuation unit and the actuator. According to the invention, a mechanical stop that delimits the adjustment of the coupling part on the actuation unit is formed. A pressure sensor monitors the pressure in the hydraulic system or a control signal of the actuator. The pressure sensor detects an installation of the coupling part on the stop based on occurring characteristic alterations of the pressure in the hydraulic connection or the control signal and controls the electrohydraulic actuator in accordance therewith and/or produces a diagnosis signal.

12 Claims, 3 Drawing Sheets

CLUTCH SYSTEM AND METHOD FOR CONTROLLING A CLUTCH SYSTEM

CROSS-REFERENCE TO RELATED APPLICATION

This application is a 35 USC 371 application of PCT/EP 2007/060997 filed on Oct. 16, 2007.

BACKGROUND OF THE INVENTION

1. Field of the Invention

The invention is based on a clutch system and on a method for controlling a clutch system.

2. Description of the Prior Art

One such clutch system is known for instance from Bosch *Kraftfahrtechnisches Taschenbuch [Automotive Handbook]*, Vieweg (Braunschweig and Wiesbaden), 1999, pages 590f. The automated clutch system shown there for instance has a clutch with a hydraulic actuation unit for connecting and disconnecting a force transmission path between a clutch input side and a clutch output side; a hydraulic connection between the actuation unit and an electrohydraulic actuator; and a control unit for triggering the actuator. In these systems, the distance at the actuation unit of the clutch or at the disengaging gear must be known, to enable controlling the frictional moment at the clutch as precisely as possible. For triggering the hydraulic actuation unit of the clutch in such systems, an electrohydraulic actuator is used. The known devices in some cases have sensors for detecting the adjusting distance of an adjustable clutch part of the actuation unit, and the sensors are integrated with the clutch in a complicated way.

For reasons of cost and space, however, there are also applications that have no sensors at the actuation unit. In that case, the adjustment of the adjustable clutch part is detected indirectly by means of the electrohydraulic actuator. For that purpose, the actuator has an actuator final control element that is adjustable by a predeterminable regulating distance and also has an absolute or incremental distance pickup on the actuator, whose zero position is defined for instance by a mechanical stop of the actuator final control element. It is a prerequisite of such systems that the hydraulic fluid in the hydraulic connection and the hydraulic components connected to of the actuator and of the actuation unit not be compressible and that no leakage occur. Under these ideal preconditions, it is assumed that the distance that the actuator final control element covers is directly proportional to the distance that the clutch part, which is adjustable for connecting and disconnecting a force transmission path between the clutch input side and the clutch output side, covers. The ratio between the regulating distance of the actuator final control element and the adjusting distance of the clutch part is called the hydraulic boost.

ADVANTAGES AND SUMMARY OF THE INVENTION

It has been that in the clutch systems known from the prior art, problems, such as leakage, air inclusions, changes in elasticity, or temperature fluctuations and other factors on the hydraulic connection between the distance detection in the actuator and the hydraulic actuation unit of the clutch can cause the position of the adjustable clutch part, which is detected indirectly by means of the distance detection of the actuator final control element, does not match the actual position of the clutch part. The possible consequence is that at the adjustable clutch part of the hydraulic actuation unit of the clutch, the distance required for opening or closing the clutch is not set, and as a result, a clutch may for instance scrape more often than necessary and can be quickly destroyed. Furthermore, the clutch can be damaged by overly long disengagement distances.

In the clutch system of the invention and in the method of the invention for controlling a clutch system it is possible to overcome these disadvantages. For that purpose, it is provided that the actuation unit of the clutch has a mechanical stop that limits the adjustment of the clutch part. Furthermore, means are provided which monitor the pressure in the hydraulic system, or a trigger signal of the actuator, such as the current through an electric motor of the electrohydraulic actuator, and detect contact of the clutch part with the stop on the basis of a characteristic change, which occurs then, in the pressure in the hydraulic system or in the trigger signal. Detecting the contact of the clutch part with the stop is effected for instance by means of a pressure sensor, which is preferably located on the actuator, or by evaluating the current at an electric motor of the electrohydraulic actuator. The sensors and/or evaluation means required for this purpose can advantageously be disposed remotely from the clutch, at a location where they involve less complication. Expensive sensors at the actuation unit can thus be dispensed with. This is highly advantageous, since at the actuation unit of the clutch, ambient conditions that are critical for sensors are present and valuable space is thus lost because of the sensors. By detecting the contact of the clutch part with a defined stop, a plausibility test of the clutch state is done in the control unit of the actuator, thus excluding sources of error in the hydraulic connection. The information thus obtained is advantageously used in the control unit for adapting the control for the future triggering of the actuator or for generating diagnosis signal.

It is advantageous if the electrohydraulic actuator has an actuator final control element that is adjustable by a predeterminable regulating distance, and means are provided which detect the regulating distance of the actuator final control element and forward it to the control unit. The pressure in the hydraulic system detected via pressure sensors, or the detected current value through an electric motor of the actuator, rises sharply upon an approach to the stop. The regulating distance of the actuator final control element at which this rise takes place reflects the position of the stop under all system factors, such as elasticities in the hydraulic connection and connection pieces and seals, and can be used upon the next clutch actuation for predetermining the distance at the actuator and thus for reliable clutch actuation.

The control unit may have a memory, in which a relationship between the clutch actuation and the regulating distance of the actuator final control element is stored that is used for triggering the actuator. This relationship may for instance be a characteristic curve stored in the memory. The contact of the clutch part with the stop that is detected in the control unit is then especially advantageously used for adapting the relationship between the clutch actuation and the regulating distance of the actuator final control element in the control unit. The relationship between the clutch actuation and the regulating distance of the actuator final control element may for instance be a relationship between the pressure in the hydraulic system, or a variable affected by it, and the regulating distance of the actuator final control element.

It is also advantageous that means are provided which, if contact of the clutch part with the stop is detected, compare the value then present for the regulating distance of the actuator final control element, or a variable derived from it, with at least one threshold value and generate an error signal as a diagnosis signal if the at least one threshold value is exceeded. This embodiment of the invention is based on the thought that if the contact of the clutch part is detected at a regulating distance position of the actuator final control element that is outside a predetermined safe range, a major error in the clutch system (such as large quantities of trapped air) is present. Ascertaining the contact point can thus be employed for diagnostic purposes.

It is especially advantageous if the mechanical stop on the actuation unit of the clutch is embodied such that the adjustment of the clutch part upon opening of the clutch and upon interruption of the fuel flow between the clutch input side and the clutch output side is limited. As a result, it is advantageously attained that the clutch part reaches the stop when the clutch is in the defined position called "clutch reliably open".

BRIEF DESCRIPTION OF THE DRAWINGS

One exemplary embodiment of the invention is described in further detail below in conjunction with the drawings, in which.

DESCRIPTION OF THE PREFERRED EMBODIMENTS

Figure 1:
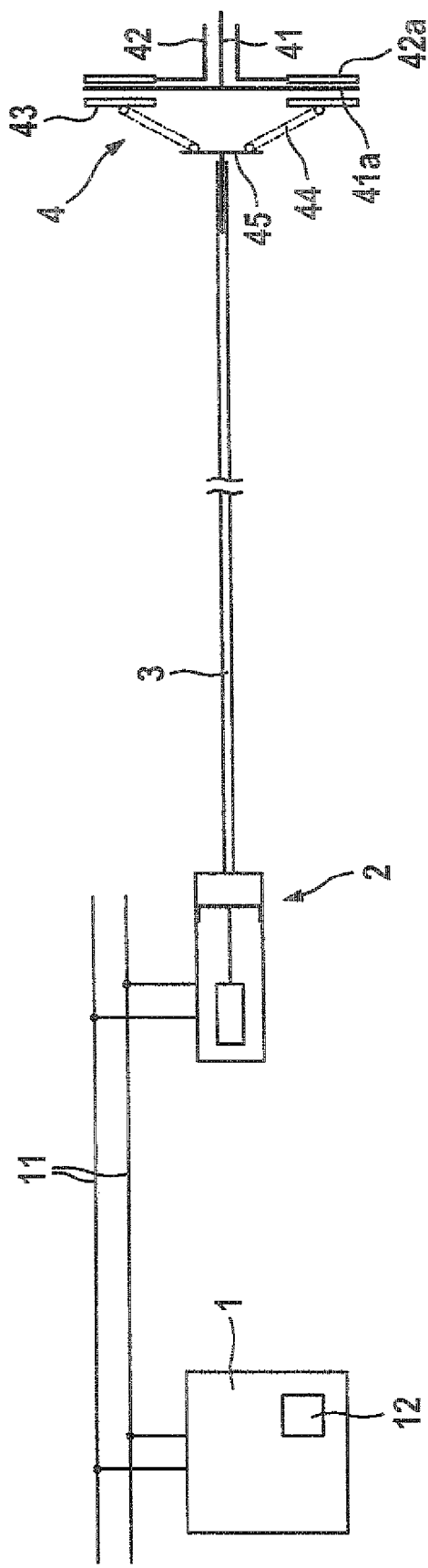
FIG. 1 schematically shows an overall construction of a clutch system of the invention.

In FIG. 1, an automated clutch system is shown schematically. The clutch system includes a control unit 1, which is for instance disposed in an engine control unit and is connected electrically to an electrohydraulic actuator 2 via a data bus 11, such as a CAN bus. The hydraulic connection of the electrohydraulic actuator is connected via a hydraulic connection 3 to a clutch 4.

The clutch 4 has a clutch input side 42 and a clutch output side 41, which can be coupled with one another for connecting and disconnecting a force transmission path. To that end, the clutch has a hydraulic actuation unit, which acts upon a disengagement bearing 45 which is connected to a pressure plate 43, for instance via a clutch spring 44. The pressure plate 43 is pressed by the clutch spring 44 against a clutch disk 41*a* and the latter is pressed against a disk flywheel 42*a*, as a result of which the clutch input side 42 (input shaft) is mechanically connected to the clutch output side 41 (output shaft). The construction of the clutch shown here is merely an example and can also be accomplished in other ways. The clutch is preferably usable as a disconnection clutch in an automated hydraulic clutch system, preferably in a motor vehicle, and in particular in a motor vehicle with hybrid drive, in order to connect a rotationally movable input shaft with a rotationally movable output shaft.

Figure 3:
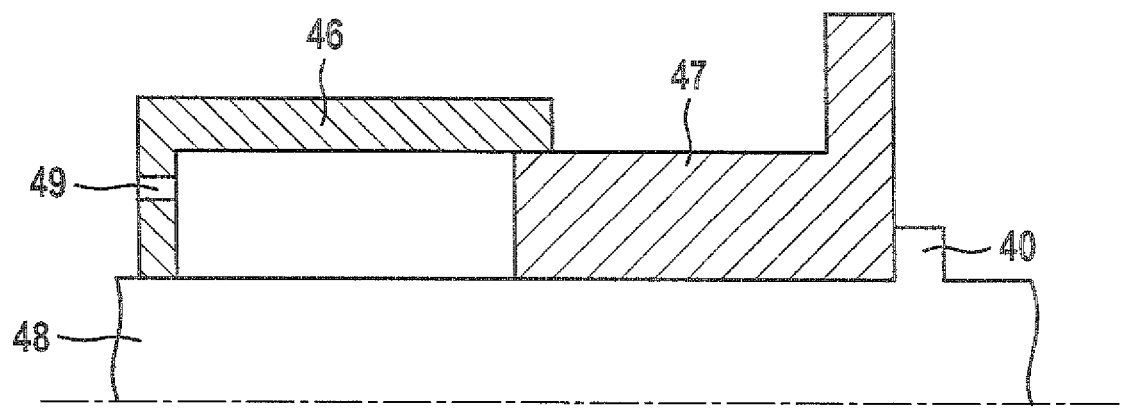
FIG. 3 is an enlarged detail of the hydraulic actuation unit of the clutch.

The clutch 4 has a hydraulic actuation unit, which is shown in more detail in FIG. 3. The actuation unit includes a hydraulic slave cylinder 46, which is supported on a shaft 48 and acts upon a clutch part 47 that is supported displaceably on the shaft 48 and connected to the disengagement bearing 45 (FIG. 1). Via a connection 49, the slave cylinder 46 is connected to the hydraulic connection 3 and can be filled with a hydraulic fluid. The hydraulic pressure in the slave cylinder 46 generates a force on the clutch part 47, which as a result is displaced on the shaft 48 and actuates the disengagement bearing 45 of the clutch in FIG. 1. As can be seen in FIG. 3, on the shaft 48 a stop 40 is provided, which limits the maximum adjustment distance of the clutch part 47, which among other things assures that the clutch part 47 is not disengaged too severely from the slave cylinder 46. In the preferred exemplary embodiment shown here, the stop 40 is embodied such that the clutch is reliably open and the force transmission path is interrupted when the clutch part 47 is resting on the stop 40. By the provision described, it is attained that by contact of the clutch part 47 with the stop 40, an adjustment distance can be approached at which the clutch assumes a defined state, which can for instance be the state known as "reliably open". However, it is also possible in principle for the stop 40 to be embodied such that the clutch assumes a different defined state.

Figure 2:
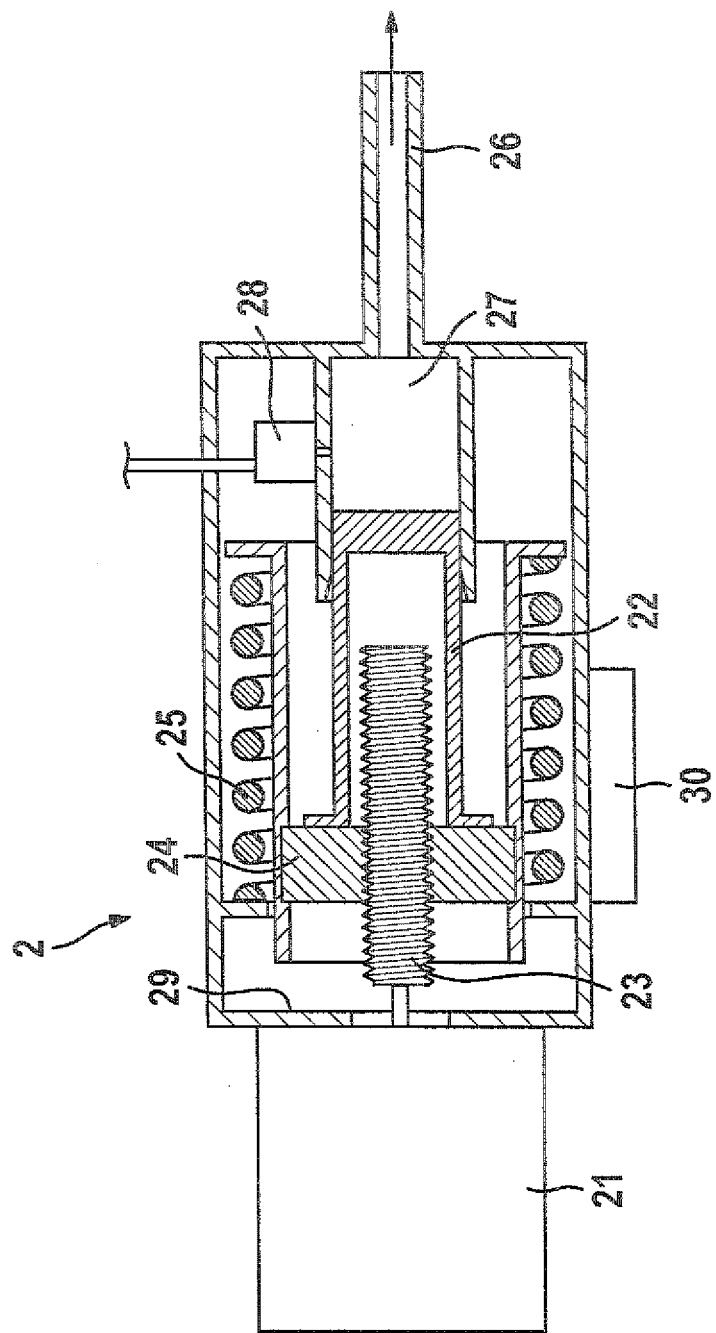
FIG. 2 shows an enlarged view of the electrohydraulic actuator.

The end of the hydraulic connection 3 that is not connected to the clutch 4 is connected to an electrohydraulic actuator 2 with distance detection and pressure sensors. An actuator of this kind is shown as an example in FIG. 2. The actuator includes an electric motor 21, which is triggerable by means of the control unit 1 (FIG. 1). The electric motor 21 for instance drives a spindle 23 with a screw thread, and the spindle 23 adjusts an actuator final control element 24 which is disposed as a rotor with a female thread on the spindle 23. In addition, the actuator final control element 24 can be subjected to the force of a spring 25 and acts on a hydraulic piston 22 that is supported in a master cylinder 27. By an actuation of the electric motor 21, the pressure in the master cylinder 27 can be raised or lowered. The master cylinder 27 is connected to the hydraulic connection 3 via a connection 26. For detecting the regulating distance of the actuator final control element 24, the actuator shown in FIG. 2 further has a distance detector 30, which is connected to the control unit 1, for instance via the CAN bus. For the actuator final control element 24, a stop 29 is embodied in the actuator. By contact of the actuator final control element 24 with the stop 29, the zero position of the regulating distance of the actuator final control element 24 can be detected. By means of the control unit shown in FIG. 1 and by means of the detected distance, a defined regulating distance at the actuator 2 can thus be predetermined.

The hydraulic components of the actuator 2 and of the actuation unit of the clutch, that is, the master cylinder 27 of the actuator and the slave cylinder 46 of the clutch, together with the hydraulic connection 3 form a hydraulic system. Via the hydraulic boost of the hydraulic system, an adjustment of the actuator final control element 24 causes an adjustment of the clutch part 47 of the actuation unit of the clutch 4. The adjustment of the clutch part 47 is dependent on the hydraulic boost between the actuation unit of the clutch and the regulating distance of the actuator final control element. The control unit 1 includes a memory 12, in which for instance a relationship between the clutch actuation and the regulating distance of the actuator final control element is stored in the form of a characteristic curve. One such relationship is shown as an example in FIG. 4. In the graph shown in FIG. 4, the pressure p in the hydraulic system is plotted on the Y axis, and the regulating distance s of the actuator final control element is plotted on the X axis. From the characteristic curve (the solid line in FIG. 4), the control unit 1 ascertains the regulating distance s of the actuator final control element that has to be set at the actuator so that the clutch assumes a desired state that is dependent on the pressure p in the hydraulic system. As can be seen from FIG. 4, in this exemplary case, upon an increase in the regulating distance s of the actuator final control element, the pressure p drops until the clutch part 47 arrives at the mechanical stop 40. Until that point, the pressure course is predetermined by the properties of the cup spring installed in the clutch. As soon as the clutch part 47 reaches the stop 40, the pressure p increases abruptly at a longer regulating distance s.

Figure 4:
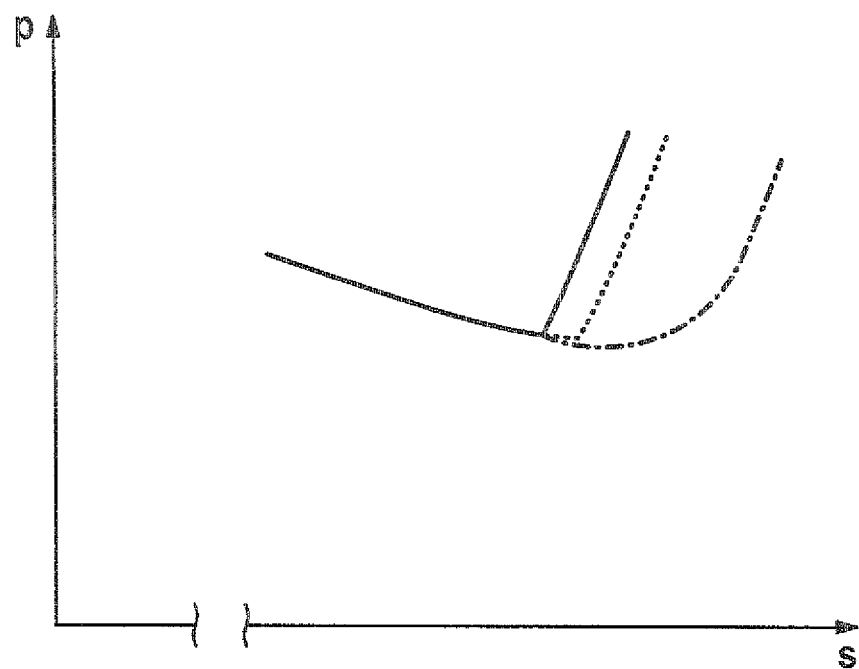
FIG. 4 shows a relationship between the clutch actuation and the regulating distance of the actuator final control element.

In the case of other than ideal, varying system properties, such as leaks or air inclusions in the hydraulic system, the adjustment of the clutch part 47 is no longer directly proportional to the regulating distance of the actuator final control element 24. A leak, for instance, causes a constantly increasing boost in the hydraulic distance. As a result, the relationship between the hydraulic pressure and the regulating distance of the actuator final control element shifts. This is indicated in FIG. 4 by the dotted line. It can also be seen there that without the kink in the characteristic curve caused by the contact of the clutch part with the stop, the originally predetermined course represented by a solid line could not be distinguished from the actual course represented by a dotted line. Air inclusions in the system cause the curve course shown in FIG. 4 to shift as indicated by the dot-dashed line. In that case, not only does the course shift, but also the line has a gentler, more slowly rising course.

Via the distance detector 30 present in the actuator, a reliable statement about the adjustment of the clutch part 47 and thus about the clutch actuation can be made only after a plausibility test. To that end, at regular intervals or irregularly, the clutch part 47 is placed against the stop 40 by means of a suitable triggering of the actuator 2. This is preferably done whenever the clutch is open, or in other words when the force transmission path between the input side and the output side is interrupted. The electrohydraulic actuator 2 may for instance have a pressure sensor 28, with which the pressure in the hydraulic system is monitored. It is especially advantageous to embody the pressure sensor on the actuator. However, this sensor may also be disposed at the hydraulic connection 3 or on a hydraulic component connected to it. The pressure detected by the pressure sensor 28 is forwarded to the control unit 1, which has evaluation means that from the characteristic change in the pressure (the pressure begins to rise steeply) find that the clutch part has reached the stop. Simultaneously, via the distance detection, the control unit has information about the instantaneous regulating distance of the actuator final control element 24 at that time. By means of the information present in the control unit 1, the control unit can for instance compare the course of pressure and regulating distance stored in memory with the actual course of pressure and regulating distance detected via the distance detector 30 and the pressure sensor 28 and ascertain a deviation (plausibility test). If a deviation occurs, then for instance the characteristic curve used for triggering the actuator can be corrected in accordance with the actual values. As a result, it is attained that in future actuations, by means of triggering of the actuator 2, the clutch can be set to defined states, since the corrected characteristic curve has been adapted to the varying hydraulic distance boost.

In a further exemplary embodiment, however, it may also be provided that instead of the pressure of the hydraulic system, a trigger signal of the actuator is monitored. For instance, the current intensity through the electric motor 21 of the actuator 2 can be monitored by providing means suitable for this on the actuator or in the control unit. Upon contact of the clutch part 47 with the stop 40, a characteristic increase in the current then occurs, on the basis of which the control unit 1 detects the contact point of the clutch part.

In a further exemplary embodiment, it is provided that the detection of the contact point of the clutch part be used for diagnostic purposes during clutch operation. For instance, the control unit can compare the regulating distance of the actuator final control element, which is detected upon contact of the clutch part 47 with the stop 40, with a threshold value and if the threshold value is exceeded can generate an error signal that is indicated for instance to the driver of the motor vehicle. Naturally, any variable derived from the regulating distance of the actuator final control element detected upon contact of the clutch part can be used. For instance, the difference between the regulating distance of the actuator detected upon contact of the clutch part and the regulating distance of the actuator originally stored in memory for that clutch state can be compared with a threshold value, or the detected course of pressure and regulating distance can be compared with a course of pressure and regulating distance stored in memory, and an error signal can be generated if there is an overly great deviation.

By means of a precise evaluation of the course of pressure and regulating distance shown in FIG. 4 or of a course of current intensity and regulating distance, in the control unit 1, a diagnosis signal can also be generated that indicates whether a leak in the hydraulic connection or air inclusions have occurred.

The foregoing relates to the preferred exemplary embodiment of the invention, it being understood that other variants and embodiments thereof are possible within the spirit and scope of the invention, the latter being defined by the appended claims.

The invention claimed is:

1. A clutch system, comprising
   a clutch with a hydraulic actuation unit having an adjustable clutch part connecting and disconnecting a force transmission path between a clutch input side and a clutch output side;
   a hydraulic connection which connects the hydraulic actuation unit with an electrohydraulic actuator disposed outside the clutch, the electrohydraulic actuator having an actuator final control element that is adjustable by a predeterminable regulating distance;
   a control unit for triggering the electrohydraulic actuator; and
   a distance detector configured to detect the regulating distance of the actuator final control element and forward the regulating distance to the control unit,
   wherein the hydraulic connection together with hydraulic components of the hydraulic actuation unit and of the electrohydraulic actuator form a hydraulic system,
   wherein the hydraulic actuation unit has a mechanical stop that limits the adjustment of the clutch part,
   wherein the control unit is configured to detect contact of the clutch part with the stop based on a characteristic change occurring at that time in either (i) a pressure in the hydraulic system detected by a pressure sensor, or (ii) a trigger signal of the actuator,
   wherein, based on detection of contact of the clutch part with the stop, the control unit triggers the electrohydraulic actuator and/or generates a diagnosis signal, and
   wherein the control unit is configured to (i) compare the value detected for the regulating distance of the actuator final control element, or a variable derived from it, with at least one threshold value in response detection of contact of the clutch part with the stop, and (ii) generate an error signal if the at least one threshold value is exceeded.

2. The clutch system as defined by claim 1, wherein the control unit has a memory, in which a relationship between clutch actuation and the regulating distance of the actuator final control element is stored, which relationship is used for triggering the actuator, and the detected contact of the clutch part with the stop is employed in the control unit for adapting the relationship between the clutch actuation and the regulating distance of the actuator final control element.

3. The clutch system as defined by claim 2, wherein the relationship between the clutch actuation and the regulating distance of the actuator final control element is a relationship between the pressure in the hydraulic system or the trigger signal of the actuator, and the regulating distance of the actuator final control element.

4. The clutch system as defined by claim 2, wherein the mechanical stop of the actuation unit limits the adjustment of the clutch part upon opening of the clutch and upon an interruption of the flow of force between the clutch input side and the clutch output side.

5. The clutch system as defined by claim 1, wherein the trigger signal is a current signal for an electric drive unit of the electrohydraulic actuator.

6. The clutch system as defined by claim 1, wherein the mechanical stop of the actuation unit limits the adjustment of the clutch part upon opening of the clutch and upon an interruption of the flow of force between the clutch input side and the clutch output side.

7. A method for controlling a clutch system which includes a clutch with a hydraulic actuation unit having an adjustable clutch part for connecting and disconnecting a force transmission path between a clutch input side and a clutch output side, a hydraulic connection which connects the hydraulic actuation unit with an electrohydraulic actuator having an actuator final control element that is adjustable by a predeterminable regulating distance and which is disposed outside the clutch, and a control unit for triggering the actuator, the hydraulic connection together with hydraulic components of the hydraulic actuation unit and of the electrohydraulic actuator forming a hydraulic system, the method comprising:
  limiting adjustment of the clutch part with a mechanical stop;
  monitoring either (i) pressure in the hydraulic system, or (ii) a trigger signal of the actuator;
  detecting contact of the clutch part with the stop on the basis of a characteristic change occurring at that time in either (i) the pressure in the hydraulic system, or (ii) the trigger signal of the actuator;
  triggering the electrohydraulic actuator and/or generating a diagnosis signal in response to detection of contact of the clutch part with the stop in the detecting step;
  detecting the regulating distance of the actuator final control element with a distance detector and forwarding the regulating distance to the control unit;
  comparing the value detected for the regulating distance of the actuator final control element, or a variable derived from it, with at least one threshold value in response to detection of contact of the clutch part with the stop in the detecting step; and
  generating an error signal in response to the at least one threshold value being exceeded in the comparing step.

8. The method as defined by claim 7, wherein the control unit has a memory, in which a relationship between clutch actuation and the regulating distance of the actuator final control element is stored, which relationship is used for triggering the actuator, and the detected contact of the clutch part with the stop is employed in the control unit for adapting the relationship between the clutch actuation and the regulating distance of the actuator final control element.

9. The method as defined by claim 8, wherein the relationship between the clutch actuation and the regulating distance of the actuator final control element is a relationship between the pressure in the hydraulic system or the trigger signal of the actuator, and the regulating distance of the actuator final control element.

10. The method as defined by claim 8, wherein the mechanical stop of the actuation unit limits the adjustment of the clutch part upon opening of the clutch and upon an interruption of the flow of force between the clutch input side and the clutch output side.

11. The method as defined by claim 7, wherein the trigger signal is a current signal for an electric drive unit of the electrohydraulic actuator.

12. The method as defined by claim 7, wherein the mechanical stop of the actuation unit limits the adjustment of the clutch part upon opening of the clutch and upon an interruption of the flow of force between the clutch input side and the clutch output side.

* * * * *